United States Patent [19]
Olmsted

[11] Patent Number: 4,556,923
[45] Date of Patent: Dec. 3, 1985

[54] TAPE CARTRIDGE DRIVE WITH CARTRIDGE DOOR OPENING MECHANISM

[75] Inventor: Dennis R. Olmsted, San Diego, Calif.
[73] Assignee: Data Electronics, Inc., San Diego, Calif.
[21] Appl. No.: 555,373
[22] Filed: Nov. 28, 1983
[51] Int. Cl.$^4$ .............................................. G11B 23/04
[52] U.S. Cl. ...................................... 360/93; 360/96.5
[58] Field of Search ....................... 360/93, 96.1, 96.5, 360/96.6, 132; 242/197–199

[56] References Cited

U.S. PATENT DOCUMENTS

| | | | |
|---|---|---|---|
| 3,669,455 | 6/1972 | Cicatelli | 274/4 E |
| 4,004,752 | 1/1977 | Kamaya | 242/198 |
| 4,050,087 | 9/1977 | Kishi | 360/96 |
| 4,093,149 | 6/1978 | Shroff et al. | 242/198 |
| 4,221,348 | 9/1980 | Moeller | 242/199 |
| 4,372,504 | 2/1983 | Shibata et al. | 242/198 |
| 4,379,313 | 4/1983 | Tsuchiya | 360/96.5 |
| 4,485,988 | 12/1984 | Kikuya et al. | 242/198 |

FOREIGN PATENT DOCUMENTS 56-61061   5/1981   Japan .................................... 360/93

*Primary Examiner*—Stuart N. Hecker
*Assistant Examiner*—Benjamin E. Urcia
*Attorney, Agent, or Firm*—Christie, Parker & Hale

[57] ABSTRACT

A door opening mechanism in a tape drive opens a door on a tape cartridge to expose a portion of the tape for contact with a movable read/write head. The cartridge is inserted endwise into a receptacle in the tape drive housing. The head is moved to a retracted position away from the cartridge so the head avoids interference with the cartridge being inserted into the receptacle. The door opening mechanism includes a rotating lever having outwardly projecting door sensing and cartridge door opening fingers. The two fingers project from the lever at different elevations and angles. A pivot mounts the lever to rotate about an axis essentially normal to the plane of travel of the cartridge into the receptacle. The lever is retained in an inoperative position with the cartridge sensing finger positioned for contact with a portion of the cartridge housing as the cartridge is inserted toward an operating position in the tape drive. The cartridge door opening finger is out of pressure contact with a cartridge door opening tab upon initial contact between the cartridge sensing finger and the cartridge. The fingers rotate in unison about the pivot under an insertion force applied to the cartridge against the cartridge sensing finger. This automatically rotates the door opening finger against the tab to pivot the cartridge door toward an open position. Once the cartridge door is open and the door to the tape drive unit is locked, the read/write head is moved to an operative position applying tension to the tape.

4 Claims, 5 Drawing Figures

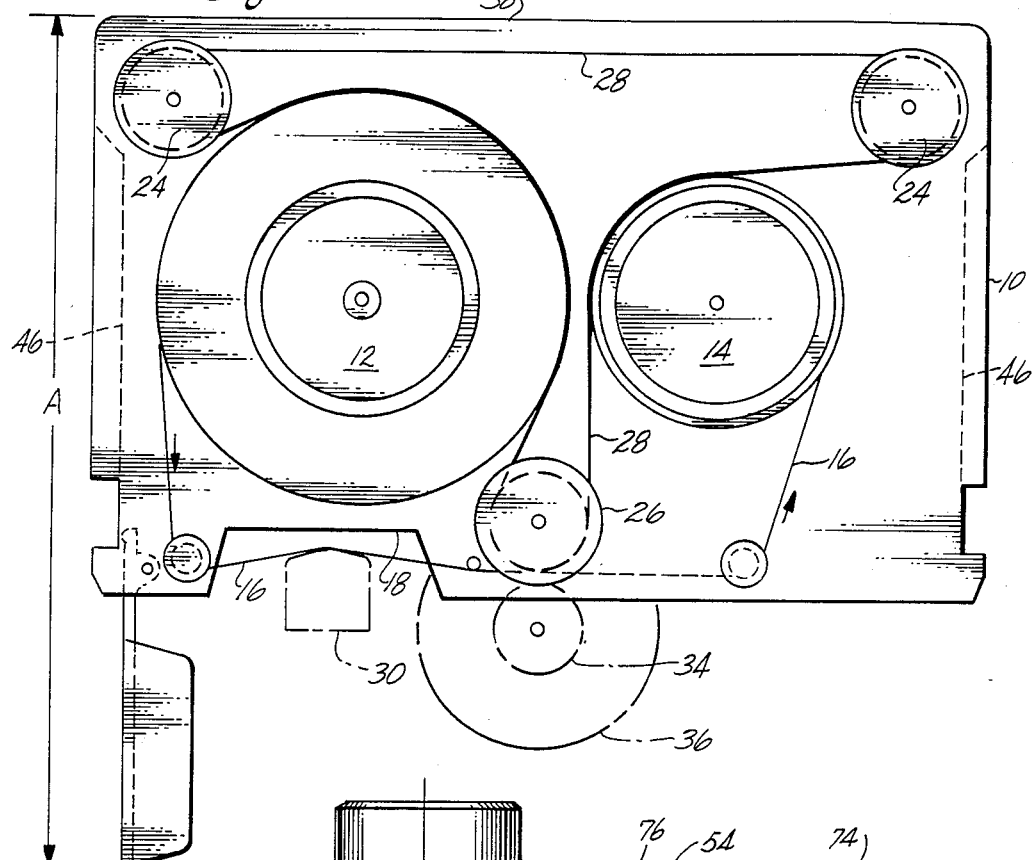
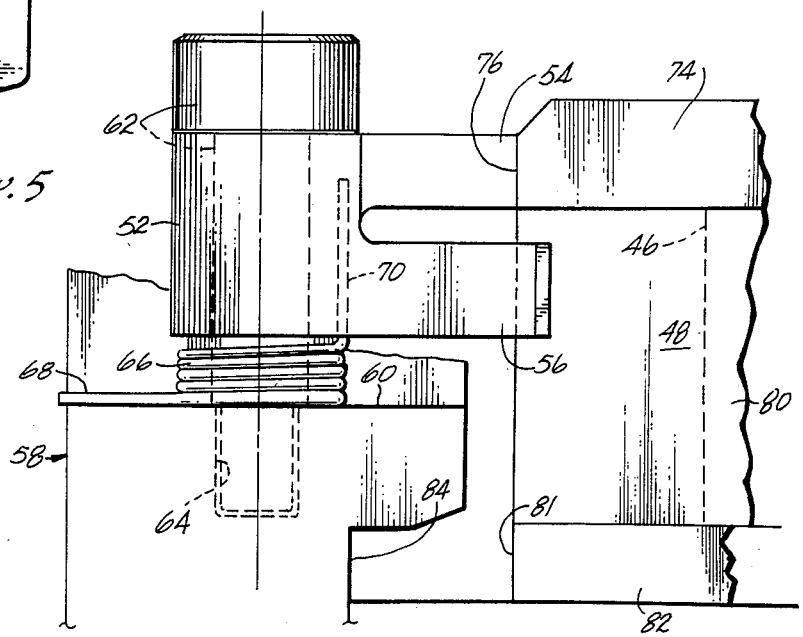

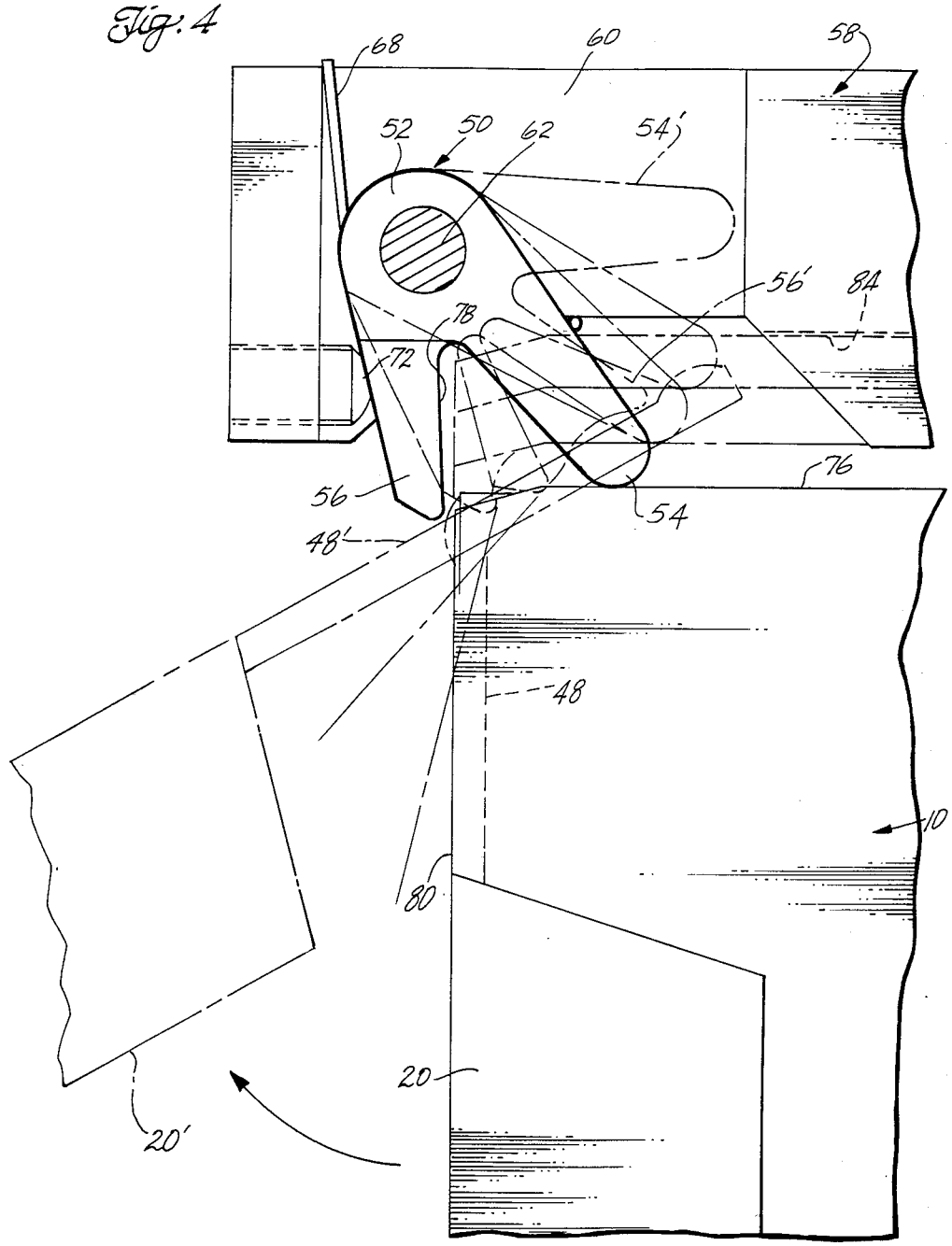

TAPE CARTRIDGE DRIVE WITH CARTRIDGE DOOR OPENING MECHANISM

BACKGROUND OF THE INVENTION

1. Field of the Invention

This invention relates to magnetic tape drives; and more particularly, to a tape cartridge drive with an improved cartridge door opening mechanism.

2. Description of the Prior Art

In recent years, computer technology has greatly expanded the market for computers, including reasonably inexpensive small computers, such a personal computers and computers for small businesses. The so-called floppy disk drives provide a common means of data storage for small computers. One floppy disk drive in common use today is the industry standard 5¼ inch minifloppy disk drive. One or more of these disk drives are typically mounted inside the computer console. A diskette is inserted or removed through one or more slots in the front of the console. In other applications, the minifloppy disk drive is contained in a separate housing for use externally to the computer console. In either instance, it has become an industry practice to provide a 5¼ inch minifloppy disk drive as a package with standard exterior dimensions.

Floppy disk drives have proved to be convenient for many applications, such as program loading and data interchange, but they have a limited data storage capacity. Because of this problem, larger capacity disk drives, such as the so-called Winchester disk drives, have been used in lieu of floppy disk drives in applications requiring greater data storage capacities. The Winchester-type disk drive generally comprises one, two, or three hard disks on which data are recorded. A Winchester-type disk drive can provide a much higher data storage capacity and faster data access and data transfer times than a floppy disk drive. Accordingly, a common practice in small business applications is to use a combination of the minifloppy disk and the Winchester disk. In this way, the day's transactions can be recorded on one or two floppy disks, and a full copy of the business's transactions can be made on a hard disk at weekly intervals or longer.

Recently, Winchester-type disk drives have been manufactured in a package with the same exterior dimensions and mounting hole locations as a standard 5¼ inch minifloppy disk drive. In this way, the Winchester disk drive can be conveniently installed in the computer console in place of a minifloppy disk drive to provide the larger data storage capacity.

Data storage for computer applications also can be provided by magnetic tape drives instead of disk drives. In recent years, ¼-inch cartridge tape drives have been replacing floppy disk drives in many applications because the tape cartridges are more compact, they can store from about 15 to 50 times more data than diskettes, and they have a lower cost per megabyte.

Tape cartridges, such as the Scotch DC 300XL data cartridge made by 3M Co., are commonly used for data storage in cartridge drives. Briefly, this type of standard tape cartridge includes a ¼-inch magnetic tape enclosed within a case. The tape is driven, in part, by an internal capstan, a portion of which is exposed at an edge of the cartridge case. When the cartridge is inserted into a receptacle in the tape drive unit, the exposed portion of the capstan engages a drive capstan driven by the tape drive motor for driving the tape. The tape cartridge also includes a door near a corner of the case. The cartridge door is normally spring-biased to a closed position for protecting the tape during storage and transport. When the cartridge is inserted into the tape drive unit, the door is tripped open to expose a portion of the tape for engaging the magnetic read/write head of the tape drive unit. The head projects into the cartridge envelope to contact the tape under the proper operating tension. The mechanism for guiding the cartridge into the receptacle not only trips open the door; it also prevents the door from contacting the read/write head when the cartridge is being inserted or removed.

The magnetic tape cartridges used in magnetic tape drives are manufactured according to industry standards approved by the American National Standards Institute (ANSI). Magnetic tape drives, including the larger ½-inch tape drives, have been able to replace the industry standard larger disk drives, such as the 8-inch, 10½-inch and 14-inch disk drives. However, the standard ¼-inch tape drive units have not been able to replace either the 5¼ inch minifloppy disk drive or the Winchester-type disk drive, because the ANSI standard size ¼-inch tape cartridge has been too large to fit into a tape drive unit that meets the industry-standard exterior dimensions of the 5¼ inch disk drives. For instance, the standard exterior width of a 5¼ inch disk drive package is 5.75 inches. With the ANSI standard size tape cartridge inserted in a standard tape drive and with the cartridge door held open to expose the tape, the cartridge case and the cartridge door in its open position cover a distance of 5.765 inches, i.e., a distance greater than the standard 5.75-inch width of the smaller disk drives.

The present invention provides a door opening mechanism for a magnetic tape drive that allows an ANSI standard tape cartridge to be inserted into a tape drive package having the same industry standard exterior dimensions as the 5¼ inch disk drives.

The ANSI standard exterior dimensions of a ¼-inch tape cartridge are 4 inches by 6 inches (when the cartridge door is closed). U.S. Pat. No. 4,498,112 entitled "Tape Cartridge Receptacle", discloses a tape drive unit which allows a ¼-inch tape cartridge to be inserted into a tape drive housing having the same exterior dimensions as the 5¼ inch disk drives. In that tape drive unit, the cartridge is front-loaded into the receptacle, i.e., the cartridge is inserted with its long dimension facing the mounting slot of the front wall of the tape drive housing. As the cartridge is inserted, the door opening tab on the cartridge door engages a cam on the cartridge guide rail which opens the door and holds it partially open, but open sufficiently to allow normal contact between the head and the tape. The amount of space taken up by this tape drive unit adjacent a computer console can be reduced if the tape drive housing is rotated 90° so that its short dimension (the end face of the unit) faces forward adjacent the computer console. However, this would require loading the cartridge into the tape drive unit endwise, i.e., inserting the cartridge lengthwise with its short dimension facing a shorter mounting slot in the end wall of the housing. If the tape cartridge is loaded endwise, the door opening tab cannot be engaged in the previously described manner because the tab and the door axis of rotation lie in the same plane as the direction of insertion. Moreover, the read/write head would normally interfere with sliding the cartridge case endwise into the tape drive unit. The head would block the cartridge because the head normally protrudes into the tape cartridge envelope.

The present invention provides a tape drive unit having a cartridge door opening mechanism which cooperates with a movable read/write head to allow a tape cartridge to be inserted endwise into the housing without interference with the read/write head. The read/write head is held in a retracted position, and the cartridge door is opened near the end of the cartridge travel into the unit. The door opening mechanism contacts the tab on the cartridge door and holds the door open at a position less than its fully open position. This allows the cartridge to fit within the confines of the desired 5¼ inch exterior dimension of the housing. Once the tape cartridge is in place in the unit, the read/write head is moved into an operating position for applying the proper operating tension to the tape. The head is retracted prior to removing the cartridge from the tape drive housing.

There is a need to ensure that the door opening mechanism which contacts the cartridge door opening tab does not cause undue wear on the cartridge door opening tab. If the tab becomes excessively worn during use, the cartridge can jam in place in the unit with the door not open sufficiently, in which case the read/write head can collide with the door. It is also desirable to open the cartridge door to as wide an angle as possible, within the confines of the 5¼ inch limitation. This would allow use of a larger read/write head.

The door opening mechanism of this invention produces essentially no wear on the cartridge door opening tab during use. It also can open the door to the maximum allowable extent. In addition, there are other advantages over ramps, cams, or toggling mechanisms that may be used to open a cartridge door.

SUMMARY OF THE INVENTION

Briefly, this invention provides a tape cartridge door opening mechanism for use in a tape drive unit for opening a door of the cartridge to expose a portion of the tape for contact with a read/write head. The cartridge door is the type that includes a closure for the exposed portion of the tape, a pivot about which the closure rotates to expose the tape, and a door opening tab on a side of the pivot axis opposite the closure and against which a force is applied to rotate the closure to its open position. The door opening mechanism comprises a rotating lever having an outwardly projecting door sensing finger and an outwardly projecting cartridge door opening finger. The two fingers project from the body of the lever at different elevations and at different angles. The lever is mounted in the tape drive unit near the end of the travel of the cartridge into the unit. The lever pivots to rotate about an axis essentially normal to the plane of travel of the cartridge into the tape drive unit. The lever is retained in an inoperative position in which the cartridge sensing finger is in position for contact with a portion of the cartridge housing as the cartridge housing travels toward an operating position in the tape drive unit. In the inoperative position, the cartridge door opening finger is out of pressure contact with the cartridge door tab upon initial contact between the cartridge sensing finger and the cartridge housing. The fingers are rotatable in unison about the pivot upon an insertion force applied by the cartridge against the cartridge sensing finger. The door opening finger is at such an angle relative to the door sensing finger that the insertion force applied to the cartridge sensing finger causes the door opening finger to rotate toward the cartridge door opening tab and pivot the closure portion of the cartridge door toward an open position upon continued forward travel of the cartridge into the tape drive unit.

In one embodiment, the invention includes biasing means on the body of the lever to rotate the fingers back to the inoperative position of the lever when contact with the cartridge is released. Stop means also are mounted for contact with the lever at a limit of angular travel under the influence of the biasing means for retaining the lever in its inoperative position.

The door opening mechanism requires an extremely low insertion force. It produces essentially no wear on the cartridge door opening tab. In addition, it can open the door of the cartridge to the maximum permissible amount owing to the angular orientation of the door opening finger at the point of maximum travel of the cartridge into the housing. Further, the opening cycle occurs over a relatively short portion of the cartridge stoke. Components are also extremely simple and of low cost.

These and other aspects of the invention will be more fully understood by referring to the following detailed description and the accompanying drawings.

DRAWINGS

FIG. 1 is a semi-schematic top plan view illustrating a standard magnetic tape cartridge inserted in a tape drive unit with the cartridge door in its fully open position to expose the tape for contact with a magentic read/write head.

FIG. 4 is a fragmentary enlarged top plan view illustrating construction and operation of the cartridge door opening mechanism.

FIG. 5 is a side elevation view illustrating the cartridge door opening mechanism.

DETAILED DESCRIPTION

Figure 2:
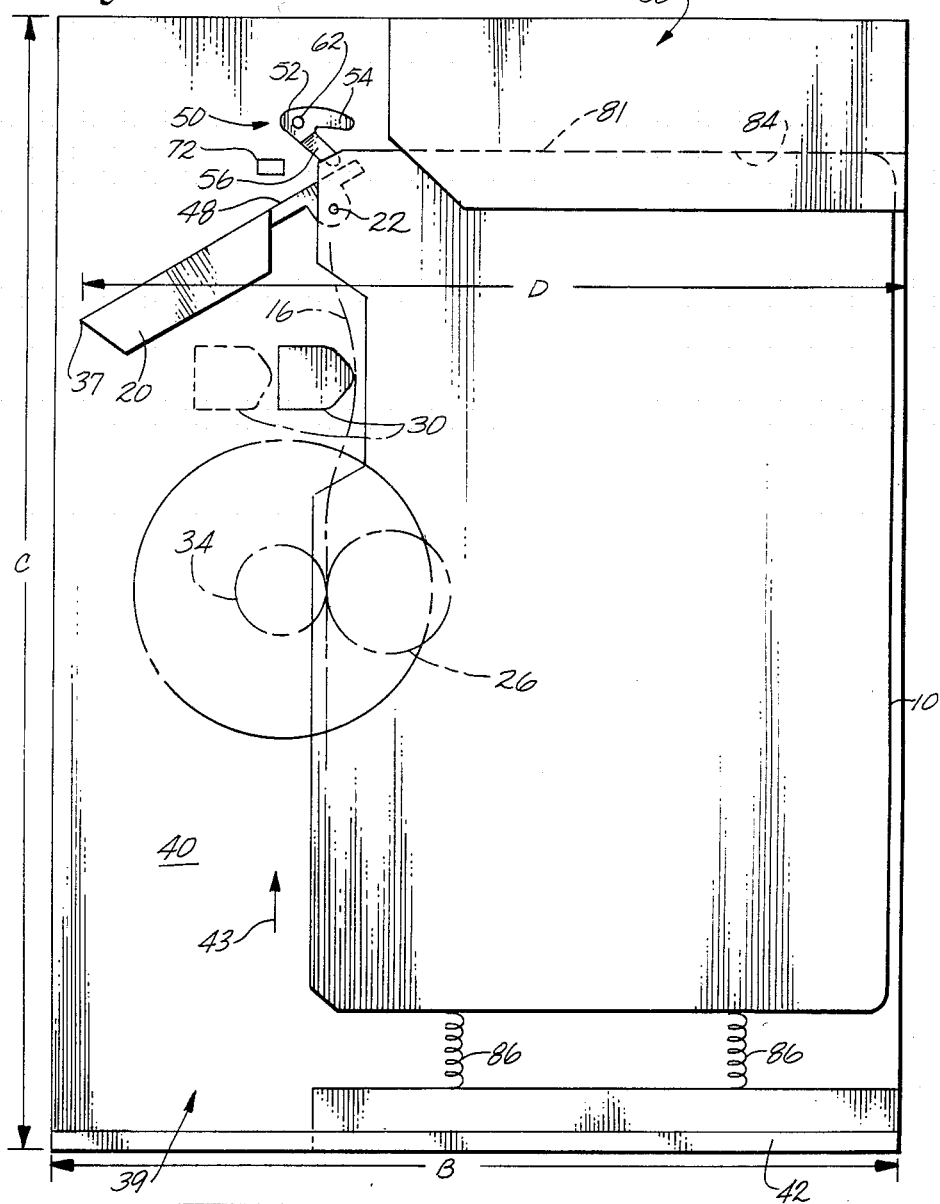
FIG. 2 is a semi-schematic top plan view illustrating the tape cartridge inserted in the tape drive unit with the door opening mechanism of this invention holding the cartridge door partially open so the exposed portion of the tape can be engaged by a read/write head.

FIG. 1 illustrates a standard tape cartridge used in a tape drive unit of this invention. Portions of the tape drive unit are illustrated in phantom lines. The tape cartridge includes a housing 10 containing a pair of tape reels, i.e., a supply hub 12 and a take-up hub 14. A magnetic recording tape 16 wound on both reels passes from one reel to the other. The tape passes through a recessed opening 18 in an edge of the tape cartridge housing. A door 20 is mounted to pivot on a pivot pin 22 at a corner of the housing. The door mechanism has a return spring (not shown) that normally closes the door over the portion of the tape exposed in the recess 18. Other portions of the tape cartridge include a pair of belt guide rollers 24 and a belt drive capstan 26 around which a flat drive belt 28 is wound. When the tape cartridge is inserted into a conventional tape cartridge receptacle, the door 20 is immediately tripped open and retained in its open position to expose a portion of the tape 16 in the recess 18. The exposed portion of tape is engaged by a magnetic read/write head 30 of the tape drive unit. The cartridge door is shown in its fully open position in FIG. 1. When the cartridge is locked in place in the tape drive unit, a drive capstan 34 on the tape drive motor 36 engages the belt drive capstan 26 for driving the tape in the direction of the arrows shown in FIG. 1.

ANSI standards control, among other things, the width of the tape cartridge housing, the location and dimensions of the recess 18, and the location and dimensions of the door 20. This, in effect, controls the maximum width of the cartridge when the door is held in its fully opened position during use. The standard distance from the tip 37 of the door in its fully opened position to the trailing edge 38 of the cartridge, as illustrated by the dimension A in FIG. 1, is 5.765 inches. As explained above, this distance is greater than the standard width of the disk drive package for the standard 5¼ inch minifloppy disk or the 5¼ inch Winchester-type disk drive.

FIG. 2 is a semi-schematic top plan view illustrating the standard tape cartridge inserted in a tape drive unit according to principles of this invention. The tape drive unit has a receptacle 39 for receiving the tape cartridge. The receptacle has a flat, rectangular base plate 40 having a maximum width B of 5.75 inches and a maximum length C of 8.00 inches. These dimensions are the maximum dimensions of the tape drive unit of this invention, and these dimensions are the same as those for a standard 5¼ inch floppy disk drive and a 5¼ inch Winchester-type disk drive. The tape drive unit has a door 42 extending along the short dimension B of the tape drive unit. When the door is opened, the cartridge is inserted into the receptacle endwise, i.e., lengthwise along the long dimension of the cartridge, as illustrated by the arrow 43. Guide rails (not shown) can be provided along opposite edges of cartridge travel into the receptacle. When the cartridge is inserted, the guide rails can contact opposite sides of the cartridge case to provide means for guiding the sliding movement of the cartridge toward and away from a locked position adjacent the read/write head 30. FIG. 2 illustrates the retracted position of the read/write head 30 in phantom lines. In its retracted position, the read/write head is spaced from the envelope of the tape cartridge so that it does not interfere with sliding the cartridge into the receptacle. The head is shown in solid lines in its operative position applying tension to the tape.

Figure 3:
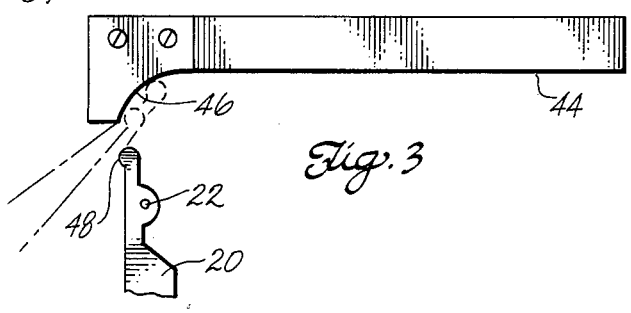
FIG. 3 is a semi-schematic top plan view illustrating a cam-type device for opening a cartridge door of a tape cartridge.

The present invention is understood best by considering FIG. 3 which illustrates an intermediate development of the cartridge door opening mechanism of this invention. In the embodiment illustrated in FIG. 3, an end locating rail 44 and a curved cam surface 46 mounted near the end of cartridge travel into the receptacle. The cartridge door 20 has a door opening tab 48 on the side of the door opposite the axis through the door pivot 22. As the cartridge nears the end of its travel into the receptacle, the tab 48 is forced against the curved ramp for opening the door to a partially open position sufficient to allow the movable read/write head to be moved from its retracted position to its operative position (shown in solid lines in FIG. 2) for applying tension to the tape. This technique for opening the cartridge door is reasonably effective and it employes no moving parts. However, it has it has two main problems: the door is not opened to the maximum extent because of interference from the curved ramp, and the curved ramp surface has a tendancy to wear the plastic door opening tab. This wear can cause the cartridge to jam in place with the door only partially open, in which case the read/write head can collide with the door.

FIGS. 2, 4 and 5 illustrate a door opening mechanism 50 which overcomes these difficulties and provides additional improvements. The door opening mechanism includes a one piece lever 52 having an outwardly projecting cartridge sensing finger 54 and a separate outwardly projecting door opening finger 56. As shown best in FIG. 5, the cartridge sensing finger 54 is at an elevation above the door opening finger 56. As best viewed from above as in FIG. 4, each finger extends at about a 45° angle with respect to the other finger. The cartridge sensing finger 54 is slightly longer than the door opening finger 56. The tip of each finger has a curved portion as shown best in FIG. 4.

The lever is mounted on the top surface of an end locator rail 58 mounted inside the cartridge receptacle at the end of the cartridge stroke. The end locator rail is an elongated block having a recessed upper surface 60 on which the lever body is mounted. A pivot post 62 mounts the body of the lever for rotation on the locator rail. The bottom shank of the post screws into a shredded receptacle 64 in the upper surface 60 of the locator rail. A torsion spring 66 is mounted between the base of the lever and the surface 60 of the locator rail. The torsion spring, in one embodiment, is a 0.016 wire diameter, 180° torsion spring, with a 0.237 maximum outside diameter and a 0.187 inside diameter. The spring is right hand wound and the preferred material is stainless steel. One end 68 of the torsion spring is affixed to the locator rail and the other end 70 of the torsion spring extends into a narrow passage in the body of the lever for holding that end of the spring in place. An adjustable stop 72 in the form of a set screw (shown best in FIG. 4) is mounted at the elevation of the door opening finger 56 on a side of the finger opposite from the path of cartridge travel. The spring normally biases the lever so that the door opening finger 56 normally contacts the stop 72 in the position shown in solid lines in FIG. 4. In this position, the door opening finger is spaced just slightly outwardly from the outer face of the tab 48 on the cartridge door 20 when the cartridge slides along its path of travel into the receptacle. The plastic upper cover 74 of the cartridge has a leading edge 76 that contacts the end of the cartridge sensing finger 54 along the normal path of travel of the cartridge into the receptacle. This point of contact is shown in FIG. 4. Thus, at the point where the cartridge sensing finger makes initial contact with the leading edge 76 of the cartridge, the door opening finger 56 extends to a point near the front corner of the cartridge, and the inside edge 78 of the finger is spaced a short distance outward from the adjacent longitudinal edge 80 of the cartridge door opening tab 48.

In use, upon insertion of the cartridge into the tape drive receptacle, the initial contact with the rounded leading edge of the cartridge sensing finger 54 is at an angle to the direction of insertion. The resultant forces generated by the continued forward pressure on the cartridge causes the door opening lever to rotate in a counter-clockwise direction (with respect to FIG. 4). This action causes the door opening finger 56 to rotate toward the cartridge and come into contact with the door opening tab on the cartridge door. This rotation continues as the cartridge is pushed farther into the tape drive receptacle. At approximately 2/3 rotation of the door opening lever the cartridge sensing finger 54 loses contact with the cartridge top, and further rotation of the lever is obtained by the forces generated by the cartridge door against the spring-biased door opening finger 56. When the cartridge is fully seated in the receptacle, a leading edge 81 of a metal base 82 of the receptacle engages a recessed upright surface 84 in a grove formed along the locator rail 58. This acts as a stop to prevent further forward motion, and in this position the cartridge is locked in its operative position in the tape receptacle. In the locked position the door opening finger 56 has rotated to the position shown at 56' in FIG. 4 where it continues to retain a spring biasing force on the tab 48 of the door to keep the door in the open position shown best in FIG. 3. With the door held in this position, the read/write head than can be rotated from its retracted position to its operative position to apply tension to the tape shown in FIG. 1.

When the cartridge is pushed into the receptacle and the door of the cartridge is opened, the tape drive door 42 is then moved to a locked position. Springs 86 on the door can contact the cartridge to hold it in the fixed position in the receptacle. When the door is locked an electrical contact can be made to then swing the head into its operative position in contact with the tape.

The door opening mechanism greatly reduces frictional wear on the door opening tab when compared with a fixed cam. It also reduces the cartridge insertion force that occurs at the end of the insertion stroke. Another benefit is that the cartridge door opens to a maximum permisssible amount. With reference to FIG. 3, when the cartridge is in the stored position the cartridge door is held in the partially open position so that the overall width of the tape cartridge is reduced compared to the prior practice of leaving the door fully open while the cartridge is in a locked position. The distance between the tip of the door and the extreme edge of the receptacle base is about 5.7 inches. This distance is less than the standard 5.75 inch depth of the 5¼ inch floppy disk drive and the 5¼ inch Winchester-type disk drives.

Thus, use of the tape drive of this invention with the door opening mechanism makes it possible to use the standard 5¼ inch tape cartridge in a tape drive unit having the same standard exterior dimensions as the 5¼ inch disk drives. Since the cartridge is opened to essentially the maximum angle permissible within the confines of the receptacle dimensions, a larger read/write head may be used. Also the open/close cycle occurs over a relatively short stroke distance of approximately ¼-inch. Components for constructing the door opening mechanism are relative simple and of low cost.

I claim:

1. A tape cartridge door opening mechanism for use in a tape drive unit to open a door on the cartridge to expose a portion of the tape for contact with a read/write head, the cartridge door being of the type that includes a closure for the exposed portion of a tape, a pivot about which the closure rotates to expose the tape, and a door opening tab on a side of the pivot axis opposite from the closure and against which a force is applied to rotate the closure to its open position, the door opening mechanism comprising:
   a rotatable lever having an outwardly projecting door sensing finger and an outwardly projecting cartridge door opening finger, the two fingers projecting from the body of the lever at different elevations and at different angles;
   pivot means for mounting the lever in the tape drive unit near the end of the travel of the cartridge into the tape drive unit, the pivot means allowing the body of the lever to rotate about an axis essentially normal to the plane of travel of the cartridge into the tape drive unit; and
   means for retaining the lever in an inoperative position in which the cartridge sensing finger is in position for contact with a portion of the cartridge housing as the cartridge housing travels toward an operating position in the tape drive unit and in which the cartridge door opening finger is out of pressure contact with the cartridge door tab upon initial contact between the cartridge sensing finger and the cartridge housing; the fingers being rotatable in unison about the pivot upon an insertion force applied to the cartridge against the cartridge sensing finger, the door opening finger being at an angle relative to the door sensing finger such that the insertion force applied to the cartridge sensing finger causes the door opening finger to rotate and apply pressure to the cartridge door opening tab to pivot the closure portion of the cartridge door toward an open position.

2. Apparatus according to claim 1 including biasing means on the body of the lever to rotate the fingers back to the inoperative position of the lever when contact with the cartridge is released.

3. Apparatus according to claim 2 including stop means for contacting the lever at a limit of angular travel under the influence of the biasing means to retain the lever in the inoperative position.

4. Apparatus according to claim 1 including an end locater rail to stop the insertion travel of the cartridge by contact with the cartridge housing at the operative position of the cartridge and in which position the door opening finger has rotated the cartridge door to a maximum open position.

* * * * *